United States Patent
Bartz

(10) Patent No.: US 6,535,107 B1
(45) Date of Patent: Mar. 18, 2003

(54) VEHICLE USER IDENTIFICATION DEVICE

(75) Inventor: Ruediger Bartz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/438,391

(22) Filed: Nov. 12, 1999

(30) Foreign Application Priority Data

Nov. 12, 1998 (DE) .......................................... 198 52 223

(51) Int. Cl.$^7$ ............................................. G05B 19/00
(52) U.S. Cl. ..................... 340/5.2; 340/5.21; 340/5.61; 340/5.64; 340/426; 455/419; 455/556
(58) Field of Search ...................... 340/5.2, 5.6, 5.64, 340/5.8, 825.69, 825.72, 825.31, 426, 5.21, 825.22; 455/556, 419

(56) References Cited

U.S. PATENT DOCUMENTS 6,323,566 B1 * 11/2001 Meier .......................... 307/10.2
6,308,083 B2 * 10/2002 King ............................ 455/556

* cited by examiner

*Primary Examiner*—Julie Lieu
(74) *Attorney, Agent, or Firm*—Crowell & Moring LLP

(57) ABSTRACT

In the case of a vehicle user identification device having a mobile transponder which contains a memory for an authorization code and a transmitting-receiving device for transmitting the authorization code to a vehicle-fixed receiver, the transponder is arranged in a user's mobile information and communication device.

8 Claims, 1 Drawing Sheet

VEHICLE USER IDENTIFICATION DEVICE

BACKGROUND AND SUMMARY OF THE INVENTION

This application claims the priority of German Application No. 198 52 223.1, filed Nov. 12, 1998, the disclosure of which is expressly incorporated by reference herein.

The invention relates to an identification device for the user of a vehicle, having a mobile transponder that contains a memory for an authorization code and a transmitting-receiving device for transmitting the authorization code to a vehicle-fixed receiver. Identification devices of this type are generally known. The transponder is preferably connected with a mechanical key to form a constructional unit. In addition, stand-alone systems are known such as in European Patent document EP 452 346 B. Such systems are often called keyless entry or passive entry systems.

The known devices are relatively easy to lose and may end up in the hands of an unauthorized user. This leads to the risk that the safety measures provided by these devices may be counteracted merely by being slightly inattentive.

It is an object of the invention to provide a device of the above-mentioned type, which is easy to handle and is hard to lose.

As the result of the arrangement of the transponder in a user's mobile information and communication device, the transponder requires no additional attention. Since the user of a mobile information and communication device is accustomed to the latter, he will rapidly notice any possible loss and take measures to prevent the vehicle from being used. A mobile information and communication device is, for example, a personal digital assistant (PDA), a notebook PC or even a mobile telephone.

In an advantageous embodiment according to the invention, the transponder is powered from an electric energy accumulator of the mobile information and communication device. This possibility not only has the advantage of low constructional expenditures but also has the characteristic that, in the event of a removal of the transponder from the mobile information and communication device and the insertion into another information and communication device, the data content will be erased, provided the data is stored in a volatile memory.

A further development of the invention relates to the mutual assignment of the transponder, the mobile information and communication device and the vehicle. A problem arises when the mobile information and communication device with a transponder, which is fixed with respect to its data content, is used for access and driving authorization for the vehicle. The clearing and blocking of the mobile information and communication device only at the vehicle, that is, in connection with vehicle usage operations, represent a weak point with respect to protection against theft, because it would enable an unauthorized user to read in the data content of his mobile information and communication device unnoticed by the authorized user and thus gain access authorization. In the event of the sale of the vehicle, the (authorized) user would also not be expected to also hand over the mobile information and communication device.

A solution to these problems is provided in that the transponder contains a volatile memory for receiving an identification code of the mobile information and communication device. The mobile information and communication device and the transponder can be separated from one another. When selling the vehicle, the user can then keep the mobile information and communication device.

However, here, the problem of synchronization with another vehicle arises. Since this problem is basic and already exists when the vehicle is first operated, a corresponding solution will be explained in detail in the following. The user may buy a transponder provided with a vehicle-specific authorization code, that is, a transponder programmed by means of vehicle data, from the car dealer under the same conditions under which he also receives a replacement key, for example, by presenting his identification card or driver's license. He can purchase the corresponding information and communication device in a specialty shop. It is important in this case that the mobile information and communication device is provided with an individual identification code, for example, with a factory-side PIN Number or, for example, also with a serial number. When the user now snaps the transponder into the mobile information and communication device, for example, into a container in the battery compartment, the transponder is supplied with energy via contacts with the energy accumulator of the mobile information and communication device. Subsequently, the identification code is read out of the logic part of the mobile information and communication device and is filed in the transponder in a volatile memory (RAM).

This mobile information and communication device can then be assigned to the vehicle. For example, by means of a mechanical vehicle key, the vehicle is opened up or started and then a transponder query is started. In this case, in addition to transmitting its authorization code, the transponder also transmits the identification code, which are both stored in the vehicle. If, in the event of another access, the two codes are transmitted, the vehicle will recognize the user as being authorized. The described identification of the user is safe with respect to manipulations because the identification code will be stored only if the vehicle-individual authorization code is transmitted together with it.

If the energy accumulator of the mobile information and communication device is changed, the content of the volatile memory will be lost. However, access to the vehicle is possible without any hindrance in the described manner. When the energy accumulator of the mobile information and communication device is activated, the identification code is read into the transponder's RAM. When queried by the vehicle, this identification code, together with the authorization code, is read out of the transponder again and is recognized in the vehicle by means of the identification code which continues to be present there and is known from the previous synchronizing operation.

When the vehicle is sold, the transponder is given to the new owner. This new owner can insert the transponder into his mobile information and communication device, which has an individual identification code. The new owner proves his access authorization by means of the mechanical key. Previously, when the transponder was inserted, the identification code had been read into the RAM of the transponder. When queried by the vehicle, this identification code, together with the unchanged and still valid authorization code, may be read out of the transponder and stored in the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
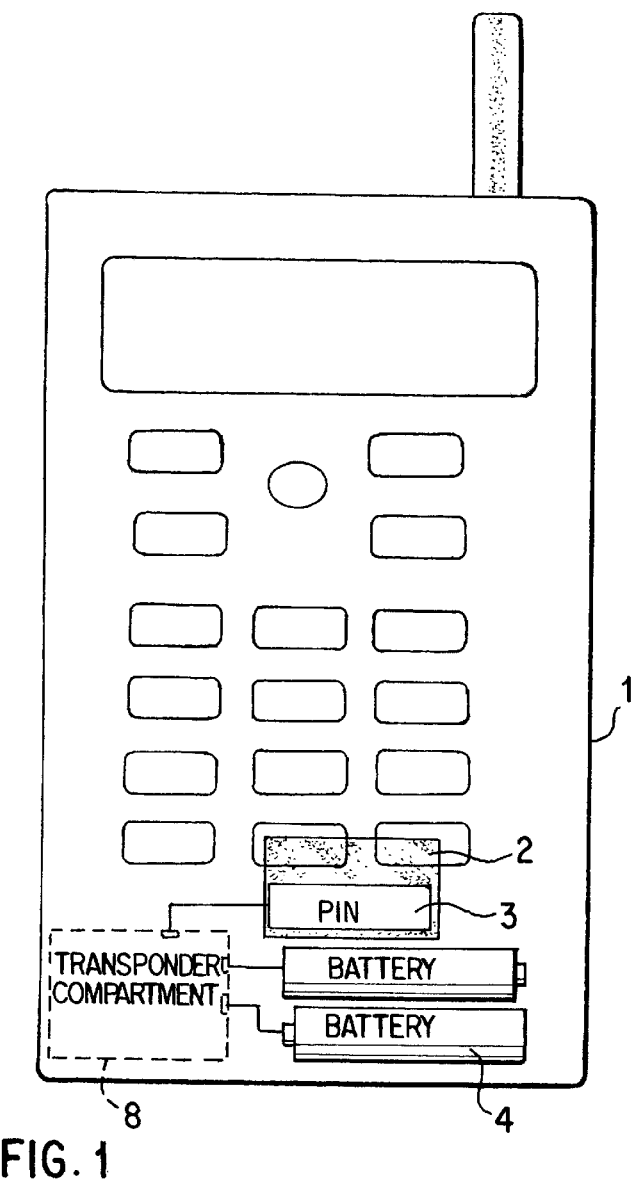
FIGS. 1 and 1a are schematic views of the construction of a mobile information and communication device, which permits accessing and/or starting the vehicle, according to the invention.
Figure 1A:
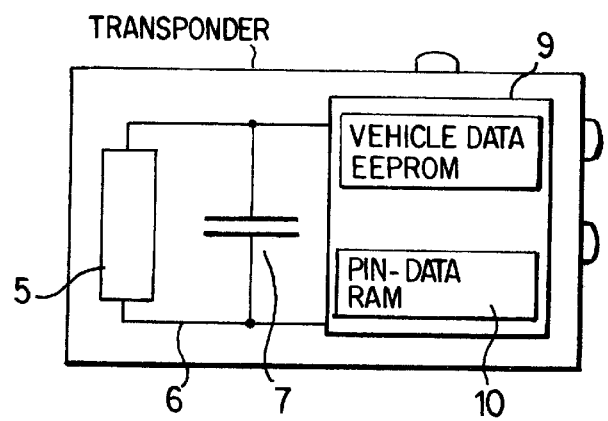

A mobile telephone 1 contains a logic part 2 with a fixed memory 3, in which an identification code (PIN) is situated. The mobile telephone 1 also has an energy accumulator (store) 4, an antenna 5 and a pertaining oscillating circuit 6, in which a capacitor 7 is situated. A transponder 9 with a volatile memory (RAM) 10 can be inserted in a receiving device 8, which volatile memory 10 also contains a vehicle-individual authorization code in a permanently stored manner.

When the transponder 9 is inserted into the receiving device 8, provided that there is an operable energy accumulator 4, the PIN is fed into the logic part 2 and is stored in the RAM 10 in a volatile manner. Upon a query from the vehicle, which is received by means of the antenna 5 and is transmitted to the transponder 9, this transponder 9 reads out the identification code as well as the authorization code and transmits it by way of the oscillatory circuit 6 and the antenna 5 to the vehicle. If the two codes are identical with the corresponding codes existing in the vehicle, the vehicle recognizes the mobile telephone or the transponder of the authorized person and unlocks the vehicle and/or prepares the start of the operation of the driving engine.

When the energy accumulator 4 is changed and/or the transponder 9 is removed from the receiving device 8 or the transponder 9 is inserted again in the receiving device 8, the PIN in the RAM 10 of the transponder 2 is first erased and, if the transponder 9 is inserted and the energy accumulator 4 is operative (again), the PIN is read out of the logic part 2 and is stored again in the RAM 10 of the transponder 9. During another transmission, the then existing authorization code, together with the unchangeable identification code of the mobile telephone, is emitted by way of the antenna 5.

As a result of the joint transmission of the authorization and identification code, it is possible to remove the transponder 9 from the mobile telephone 1 and insert it into another mobile telephone. In the case of this mobile telephone, the different identification code existing in this telephone, together with the vehicle-individual authorization code of the transponder 9, is transmitted to the vehicle and, if both codes exist in the vehicle, the user is again recognized as being authorized.

The user obtains the authorization in that, in a learning mode, the identification code of the mobile telephone is transmitted together with the authorization code already stored in the vehicle. The learning mode is set, for example, in that a mechanical vehicle key is used, and the vehicle is mechanically opened or an ignition starter switch is mechanically closed.

This learning mode will in each case be required when the transponder (with the vehicle-individual authorization code) is inserted into a new mobile telephone (with a new identification code). If, by contrast, only the energy accumulator is exchanged, as the result of the new supply to the transponder 9 and thus to its volatile memory 10 from the energy accumulator 4, the PIN is read out of the logic part 2 and is stored in the RAM 10 of the transponder 9. During transmission, the authorization and identification code already known to the vehicle is again forwarded to the vehicle. A battery exchange thus does not have any effect on the operability of the illustrated mobile telephone 1.

In this manner, it is possible to provide a mobile information and communication device 1 with the functionality of a transponder and carry out the opening or the start of the operation of the vehicle without having to use a separate transponder provided for this purpose.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle user identification device, comprising:
   a mobile transponder including a memory for storing an authorization code and a transmitting/receiving device for transmitting said authorization code to a vehicle-fixed receiver; and
   a mobile information and communication device, wherein said mobile transponder is operably arranged in a removable manner in said mobile information and communication device and operates to identify the vehicle user based on a unique characteristic of the mobile information and communication device.

2. The device according to claim 1, wherein said transponder is powered via an electric energy accumulator of said mobile information and communication device.

3. The device according to claim 1, wherein the mobile information and communication device has an identification code, said identification code being used along with the authorization code to identify a vehicle user.

4. A vehicle user identification device, comprising:
   a mobile transponder including a memory for storing an authorization code and a transmitting/receiving device for transmitting said authorization code to a vehicle-fixed receiver; and
   a mobile information and communication device, wherein said mobile transponder is arranged in said mobile information and communication device;
   wherein said transponder is powered via an electric energy accumulator of said mobile information and communication device; and
   wherein said transponder further includes a volatile memory for receiving an identification code of the mobile information and communication device.

5. The device according to claim 4, wherein said identification code is transmittable together with the authorization code.

6. The device according to claim 4, wherein said identification code is readable into a vehicle-fixed memory.

7. The device according to claim 5, wherein said identification code is readable into a vehicle-fixed memory.

8. The device according to claim 5, further comprising a blocking mechanism to block the reading-in of the identification code, said blocking mechanism being deactivated only by an authorized user.

* * * * *